United States Patent [19]

Brittain et al.

[11] Patent Number: 4,496,499
[45] Date of Patent: Jan. 29, 1985

[54] PROCESS FOR LINING HIGH PRESSURE PIPELINE

[76] Inventors: Perry N. Brittain, 711 Willamette Dr., SE.; John D. Kirkpatrick, Suite 2008, 1200 6th St. SW., both of Calgary, Alberta, Canada

[21] Appl. No.: 359,498

[22] Filed: Mar. 18, 1982

Related U.S. Application Data

[63] Continuation-in-part of Ser. No. 115,488, Jan. 25, 1980, abandoned.

[51] Int. Cl.³ .................. B29C 17/07; B32B 31/04
[52] U.S. Cl. .................................. 264/36; 156/64; 156/87; 156/94; 156/287; 264/40.1; 264/516; 264/265; 264/269
[58] Field of Search ............... 264/36, 512, 516, 269, 264/40.1, 265; 156/287, 64, 87, 94; 138/97

[56] References Cited

U.S. PATENT DOCUMENTS

| | | | |
|---|---|---|---|
| 2,794,758 | 6/1957 | Harper et al. | 156/287 X |
| 3,142,868 | 8/1964 | Blount | 264/269 X |
| 3,560,295 | 2/1971 | Kimbrell et al. | 264/516 X |

FOREIGN PATENT DOCUMENTS 531102 10/1956 Canada .

OTHER PUBLICATIONS

"Sewer Renewal by Insertion with Nipak Polyethylene Pipe", *Nipak*, 5-9-73.

*Primary Examiner*—Jan Silbaugh
*Attorney, Agent, or Firm*—Bacon & Thomas

[57] ABSTRACT

A method for lining a high pressure pipeline with a tubular plastic liner. After depressurizing, purging and cleaning the pipeline is broken into discrete sections each of which is to receive a liner segment. The sections are reamed to remove obstructions which might damage the liner and a close-fitting liner segment is drawn into each section. Each liner segment is fixed at opposed ends of respective pipeline sections to prevent longitudinal movement of the segments. Bleeder holes are provided through the pipeline walls at opposed ends of each pipeline section. After the pipeline sections are reconnected to reform the pipeline, a relatively warm, pressurized fluid is pumped through the pipeline to radially expand each liner segment against the inner walls of the pipeline, thus evacuating the spaces between liner segments and pipeline sections by forcing air, water and other impurities through the bleeder holes.

11 Claims, 13 Drawing Figures

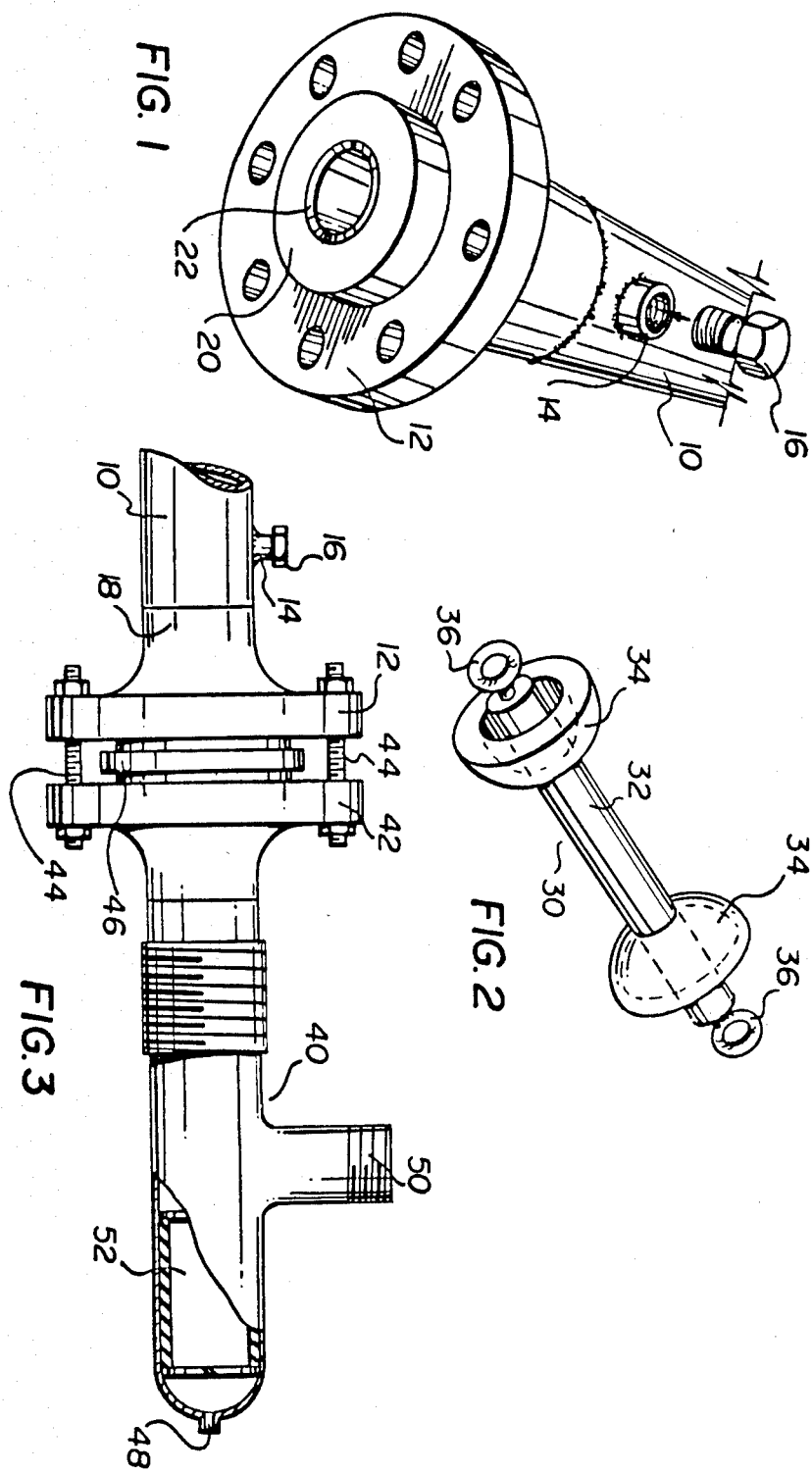

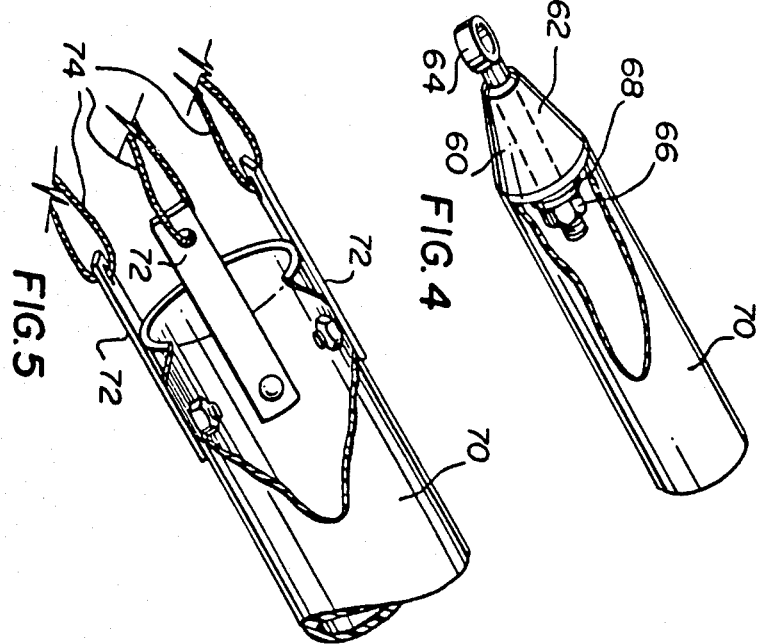
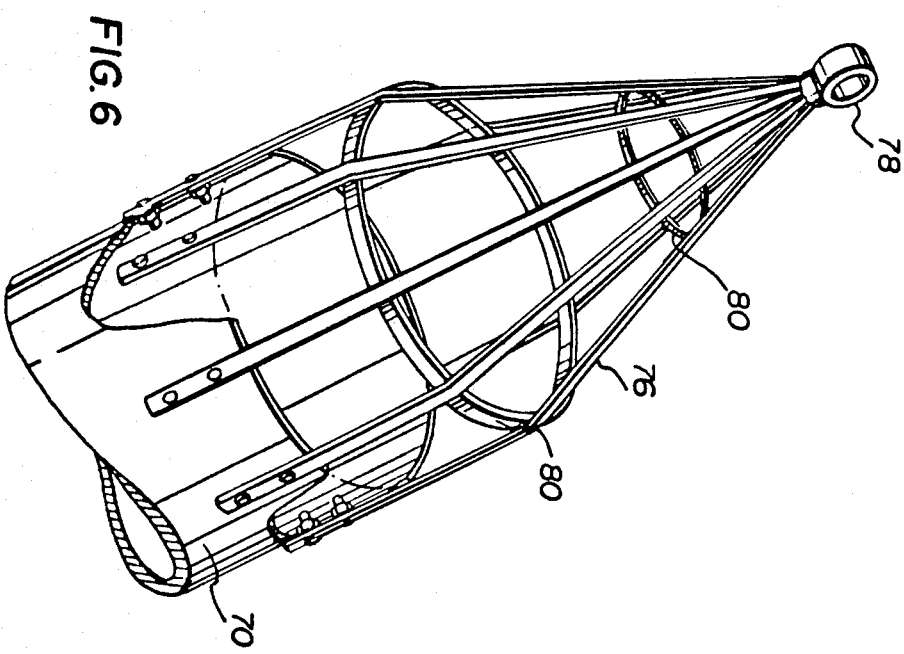

PROCESS FOR LINING HIGH PRESSURE PIPELINE

This is a continuation-in-part of application Ser. No. 115,488 filed Jan. 25, 1980 and now abandoned.

FIELD OF THE INVENTION

This invention relates to methods for lining pipelines, and, in particular, to a method for lining a buried high pressure pipeline.

BACKGROUND OF THE INVENTION

It is known to provide a loose-fitting plastic liner to extend the life of an existing low pressure pipeline. (By "low pressure" it is meant that pressures inside the pipeline do not exceed about 150 pounds per square inch ["psi"] when the pipeline is in service.) However, plastic liners are not used in high pressure pipelines such as water injection lines where pressures of 5,000 psi or more may be encountered inside the pipeline. The reason for this is that in conventional "relining" applications, the existing pipeline is used simply as a "guide" to receive a loose-fitting tubular plastic insert. The loose-fitting insert, once installed in the pipeline, serves as a new "pipeline"—the insert conveys the material formerly conveyed by the pipeline, but, in so doing, must be capable of withstanding whatever pressures may be required to transport the material there-through. Such loose-fitting plastic inserts are unsuitable for use in high pressure pipelines because they are not capable of withstanding the strain encountered when the interior region of the liner is pressurized, forcing the liner to expand radially toward the internal walls of the pipeline. Viewed in this light, it becomes apparent that, strictly speaking, the use of a loose-fitting insert is not properly described as "pipeline relining" because the insert does not serve as a "liner" but serves instead as a new pipeline having a somewhat smaller outside diameter than the inside diameter of the existing pipeline, there being an annular gap between the outer wall of the plastic insert and the inner wall of the existing pipeline.

The present invention, by contrast, provides a close-fitting liner. After completion of the procedure hereinafter described, the liner is disposed inside the pipeline with no annular gap between the liner and the pipeline. Because the liner contacts the inner walls of the pipeline, the liner itself need not be capable of withstanding the pressures encountered inside the pipeline.

Loose-fitting plastic inserts are conventionally installed in pipelines in an effort to extend the piping system life at a cost somewhat lower than that of installing a new pipeline. Loose-fitting plastic inserts are sometimes also intended to protect an existing pipeline against internal corrosion or abrasion. The installation of a loose-fitting plastic insert into a pipeline may also improve the flow characteristics of the pipeline beyond those observed in a similar pipeline which is not equipped with a loose-fitting plastic insert. Loose-fitting plastic inserts may also eliminate, or at least reduce the need to use oxygen scavengers, rust inhibitors or other chemicals to maintain the pipeline. The present invention, while providing these and other advantages, provides the further advantage that it is not restricted to use in low pressure applications but may be used in applications where internal pipeline pressures of several thousand psi are encountered.

Accordingly, it is an object of the present invention to provide a method of lining a pipeline with a plastic liner such that the lined pipeline is capable of withstanding internal pressures in excess of those which the liner alone could withstand.

A further object is to provide such a method which is relatively inexpensive, when compared with the cost of installing a new pipeline, and which is relatively easy to implement.

SUMMARY OF THE INVENTION

The invention provides a method of lining a section of a high pressure pipeline which utilizes the structural strength of the pipeline to enable the lined pipeline section to be operated at high pressure. The pipeline section includes first and second flanges disposed at opposite ends thereof. The method comprises the steps of:

(a) providing a firm plastic liner having:
 (i) a wall thickness such that the liner is form-sustaining;
 (ii) an outside diameter sufficiently less than the inside diameter of the pipeline to enable drawing the liner through the pipeline section, but sufficiently large so that the liner can be non-destructively radially expanded against the inside wall of the pipeline;
(b) drawing the liner into the pipeline section until the liner is substantially longitudinally co-extensive with the pipeline section;
(c) longitudinally stretching the liner within the section;
(d) fixing the liner against longitudinal movement within the section;
(e) opening at least one bleeding port in the section;
(f) radially expanding the liner against the inside wall of the pipeline to an extent to permanently change the liner outside diameter from its original size to a size conforming to the inside diameter of the pipeline;
(g) during step (f), bleeding the space between the liner and the pipeline through the bleeding port; and,
(h) closing the bleeding port.

Preferably, the liner is radially expanded by no more than 6% of its original diameter. Advantageously, the radially expanding step comprises applying to the liner a relatively warm fluid under relatively low pressure. The fluid may have a temperature of about 180 degrees F. and a pressure of not more than about 100 psi.

The liner is fixed in the pipeline section by the following steps:

(a) before the drawing step, affixing a first flange to an end of the liner segment;
(b) after the drawing step, positioning the first liner flange against the first pipeline section flange;
(c) after the stretching step, affixing a second flange to the end of the liner segment opposite the first liner flange; and,
(d) positioning the second liner flange against the second pipeline flange.

Advantageously, before the radially expanding step, the liner flanges are encircled with retaining rings.

DRAWINGS

FIG. 1 is a perspective view of an end of a pipeline section having a flange affixed thereto;

FIG. 2 is a perspective view of a cable-carrying pig;

FIG. 3 is a fragmentary plan view of a pig launching device coupled to a pipeline section;

FIG. 4 is a fragmentary perspective view of a pulling head affixed to a liner segment;

FIG. 5 is a fragmentary perspective view of an alternate pulling arrangement affixed to a liner segment;

FIG. 6 is a fragmentary perspective view of a further alternate pulling arrangement affixed to a liner segment;

DESCRIPTION OF AN EMBODIMENT OF THE INVENTION

Figure 7:
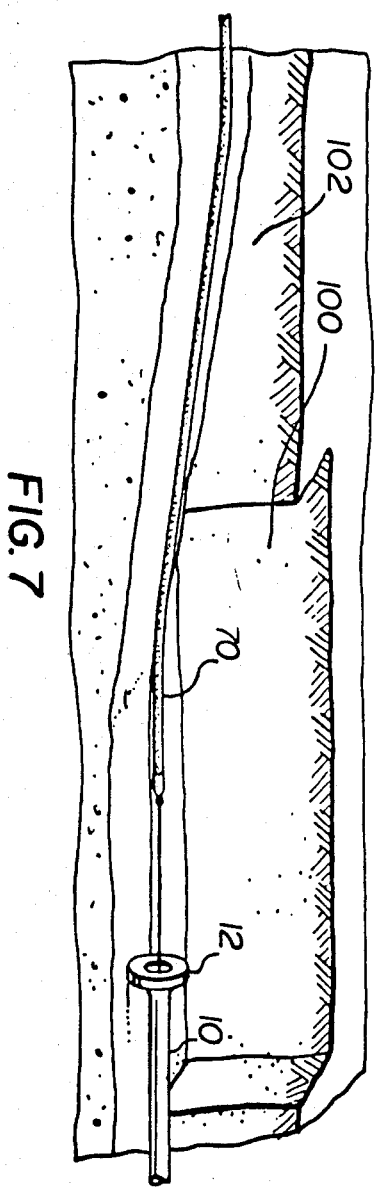
FIG. 7 is a perspective view of an excavation site showing a partially exposed portion of a pipeline section into which a liner segment is about to be pulled.

The following description will make particular reference to the insertion of a plastic liner into a pipeline which is buried in situ. It is to be understood however, that the method is of general application and may be used with pipelines or pipeline sections which are not buried.

SITE PREPARATION

Before commencing installation of a liner into a pipeline, the right of way along the pipeline route should be examined to determine suitable points at which the pipeline may be uncovered and broken to create a plurality of pipeline sections, each of which sections is to receive an individual liner segment. Typically, for the preferred liner material referred to hereinafter, the pipeline will be broken about every 2,000 feet. It is recommended that pipeline sections not exceed about 2,500 feet in length because the tensile yield point of the liner material might be exceeded and the liner consequently damaged if the liner segment is subjected to the force necessary to pull it through a pipeline section over such a distance. Otherwise, the length of particular pipeline sections is not particularly critical and may be varied to accommodate conditions along the pipeline right of way so as to avoid swamp areas, roads, rail crossings, etc. The length of individual pipeline sections may also be limited by the availability of winch equipment of a capacity sufficient to exert the force necessary to pull a liner segment of a given length through a pipeline section.

Before work commences, the pipeline should be depressurized, purged, and cleaned if necessary.

LINER MATERIAL

The preferred liner material is polyethylene plastic in a firm, tubular, form-sustaining configuration (i.e. plastic pipe) which may be field-assembled into segments up to 2500 feet in length and which can withstand a radial expansion of at least 6% without cracks developing for at least one year. The liner material should have an environmental stress crack resistance (E.S.C.R.) rating in excess of 1000 hours when tested in accordance with conditions A, B and C of ASTM test D-1693-75. Ultra High Molecular Weight High Density Polyethylene ("UHMWHDP") which meets Plastic Pipe Institute designation P.E. 3406 is especially preferred for use as the liner material. An acceptable liner material is manufactured by Phillips Products Co., Inc. under the trade mark Driscopipe 8600.

LINER OUTSIDE DIAMETER

The outside diameter of the liner material must be carefully selected as a function of the inside diameter of the pipeline. If the outside diameter of the liner material is too large, then it may not be possible to pull a liner segment through a pipeline section without subjecting the liner segment to forces so great that it is ruptured. On the other hand, if the outside diameter of the liner material is too small, then the liner may be ruptured when it is radially expanded inside the pipeline as hereinafter described.

Tests indicate that UHMWHDP in tubular form may be expanded radially by a factor of about 12% to 15% before rupture occurs. As a safety measure, these factors are halved in an effort to ensure that the liner material is not ruptured when radially expanded to contact the internal pipeline wall. Preferably, the liner material is radially expanded by a factor of no more than 6% of its original diameter. If radial expansion of the liner material is limited in this manner, there will be minimal risk that factors such as irregularities in the inside diameter of the liner material, or surface damage caused in pulling a liner segment into a particular pipeline section will result in rupture of the liner.

As a practical matter, the following table illustrates outside diameters of UHMWHDP liner materials which have proved acceptable in field applications:

| Pipeline Inside Diameter | Liner Material Outside Diameter as a % of Pipeline Inside Diameter |
| --- | --- |
| 2" to 3" | 94% |
| 4" | 95% |
| 6" to 8" | 96% |
| 10" and above | 96.5% to 97.5% |

The closer tolerance used with larger diameter pipelines represents a decrease in deformation of the liner material as it is radially expanded to contact the inside wall of the pipeliner with a commensurate decrease in probability that the liner material will rupture.

LINER WALL THICKNESS

The wall thickness of the liner material will be governed by a number of considerations.

To some extent, expense will govern the liner material wall thickness. Suppliers of liner material have reported that considerable cost is involved in retooling to produce a liner material of a given wall thickness. A further complication faced by suppliers of liner material is that, as mentioned above, the outside diameter of the liner material must be carefully selected where it is desired to insert a close-fitting liner into a pipeline. Ideally, both the outside diameter and the wall thickness of the liner material are individually matched to a given application. Usually, however, the expense involved in individually matching both parameters dictates a practical compromise in which the outside diameter of the liner material is carefully selected with an attendant sacrifice in wall thickness dimension. For example, the liner material supplier may use a die which is capable of producing a tubular plastic material having a standard outside diameter and a standard wall thickness, but adjust his production method to vary the outside diameter of the liner material as required, which may result in an increase or a decrease in the wall thickness of the liner material.

A further factor governing liner material wall thickness arises because the liner material is usually supplied in relatively short lengths which are heat fused together at the pipeline relining site to produce liner segments up to 2500 feet in length for insertion into particular pipeline sections. The wall thickness of the liner material will, to some extent, affect the quality of the joints at which the lengths of liner material are heat fused. For example, a liner material having an exceptionally thin wall would be difficult to heat fuse because the ends of the material would tend to assume an oval shape when clamped and heated in a conventional fusion joining machine. Practical field experience suggests that the liner material wall thickness should not be less than about 0.13 inches to prevent this problem. Preferably, the wall thickness of the liner material is greater than about 0.2 inches so that the original tubular form of the liner may be sustained while liner segments are heat fused together.

In some applications the fluids to be transported through the lined pipeline may abrade the liner material. Tests may be conducted to determine the rate at which the liner material is abraded by a particular fluid and then a liner wall thickness may be calculated by assuming a given desired lifetime for the liner material.

Each segment of liner material must be capable of withstanding the forces imposed on the segment when it is pulled into a given pipeline section as hereinafter described, without stressing the liner material beyond its tensile yield point (the liner material tensile yield point should be obtainable from the liner material supplier). As the liner material wall thickness decreases, greater care must be exercised in drawing the liner segment into the pipeline section to avoid exceeding the liner material tensile yield point and consequent damage to the liner segment.

The wall thickness of the liner material may also be determinative of the ability of the liner to resist collapse if the interior of the liner is ever subjected to vacuum. An approximation of the collapse pressure "$P_c$" (in pounds per square inch) may be obtained from the formula:

$$P_c = 2E(t/D)^3/(1-u^2)$$

where:
E = stiffness modulus (in pounds per square inch) of the liner material (available from the manufacturer of the liner material)
t = liner material wall thickness (in inches)
D = outside diameter of liner material (in inches)
u = Poisson ratio (about 0.45 for UHMWHDP liner material).

The liner will tend to collapse if the collapse pressure is greater than or equal to 1 atmosphere (14.5 pounds per square inch). The wall thickness required to sustain the original tubular form of the liner material and resist such collapse may therefore be calculated for a liner material of a given outside diameter.

As discussed hereinafter, the preferred installation procedure may produce a vacuum in the annular region between the outside wall of a liner segment and the inside wall of the pipeline section which contains that liner segment. A vacuum in this annular region would tend to offset a vacuum inside the liner segment. The wall thickness of the liner material required to resist collapse due to internal vacuum could then be decreased somewhat to take advantage of the offsetting vacuum surrounding the liner segment.

As a practical example, the following table summarizes the wall thickness of UHMWDP liners which have been used successfully in close-fitting pipeline relining applications:

| Pipeline Outside Diameter | Pipeline Inside Diameter | UHMWHDP Liner Material Outside Diameter | UHMWHDP Liner Material Wall Thickness |
|---|---|---|---|
| 12.750" | 12.250" | 11.60" | 0.370" |
| 10.750" | 10.250" | 9.70" | 0.335" |
| 6.625" | 6.193" | 5.90" | 0.270" |
| 4.500" | 4.163" | 3.83" | 0.130" |

PREPARATION OF LINER SEGMENTS AND PIPELINE SECTIONS

Liner segments may be assembled on-site using a conventional fusion joining machine to fuse lengths of liner material together. The liner segments should be at least 20 feet longer than the respective pipeline sections into which they are to be inserted. The external bead of polyethylene which is created on the liner segment by the fusion joining procedure must be removed to leave a smooth surface which will not impede passage of the liner segment through the pipeline section or interfere with radial expansion of the liner as hereinafter described. An "external bead trimmer" satisfactory for this purpose may be obtained from McElroy Equipment of Tulsa, Okla. Since significant strain will be imposed on the fused joints during the stretching step hereinafter described, extreme care should be used to avoid defects in the fused joints.

Figure 9:
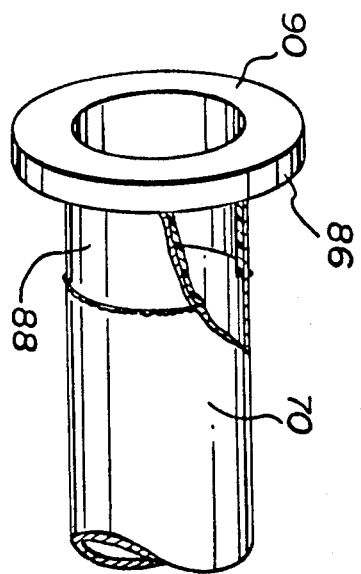
FIG. 9 is a fragmentary perspective view of a liner segment having a plastic flange affixed thereto.
Figure 10:
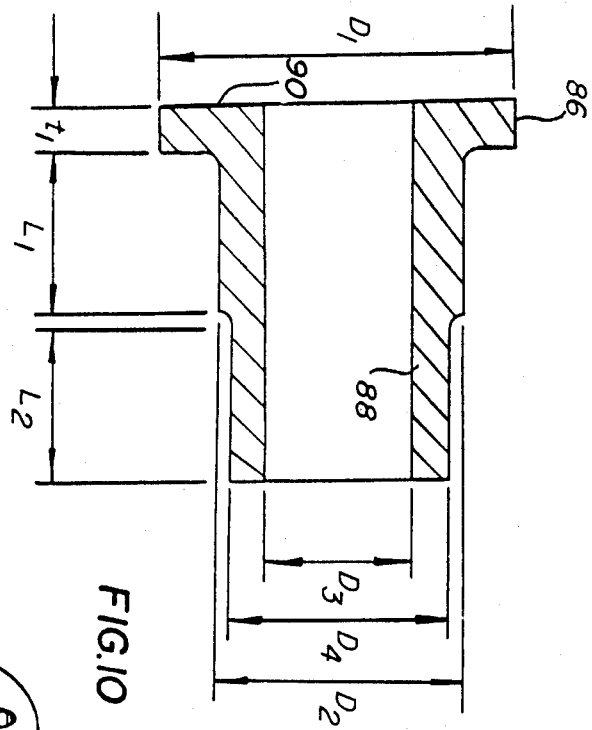
FIG. 10 is a cross-sectional view, on a slightly enlarged scale, of the plastic flange of FIG. 9.

A plastic flange 86 is fused onto one end of each liner segment as a preparatory step (FIG. 9). FIG. 10 is a cross-section view of a plastic flange 86 which provides details of the construction of an acceptable flange. In FIG. 10:

$D_1$ = Diameter of raised outer face of pipeline flange 12.
$D_2$ = Inside diameter of pipeline.
$D_3$ = Inside diameter of liner material.
$D_4$ = Outisde diamater of liner material.
$t_1$ = Thickness of flange 86 (should be the greater of:
  (i) thickness of a standard #150 polyethylene flange; or
  (ii) twice the wall thickness of the liner material).
$L_1$ = a sufficient distance to ensure that the taper of flange 86 will rest inside the steel flange to steel pipe weld.
$L_2$ = greater than or equal to the width of the fusion joining machine holding clamp.

A first pipeline section is uncovered at opposed ends by excavating a pair of "bell holes" along the pipeline right of way. A typical bell hole 100 is shown in FIG. 7. For ease of illustration, only one pipeline section 10 is shown in FIG. 7. The pipeline, when initially uncovered, would of course extend through bell hole 100 from right to left.

The pipeline is severed in each bell hole, defining a discrete pipeline section between the two bell holes. For smaller diameter pipelines (2 to 4 inches) it will usually be convenient to uncover the pipeline for about 50 to 100 feet on both sides of the bell hole so that opposing ends of the pipeline in the bell hole may be manoeuvred away from one another for ease of working. Larger diameter pipelines are usually much more stiff and less manoeuvrable.

Figure 11:
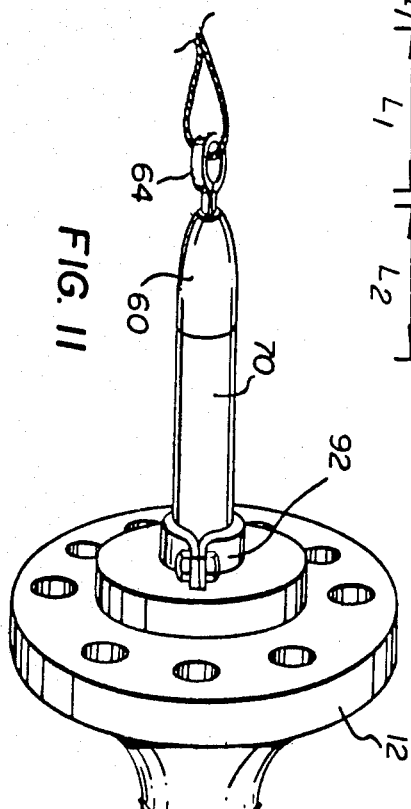
FIG. 11 is a perspective view showing the clamping against longitudinal movement of a liner segment which has been drawn through a pipeline section.

For a high pressure pipeline (typically steel) flanges 12 (FIGS. 1, 3 and 11) are welded onto opposite ends of pipeline section 10 to facilitate reforming of the pipeline when the pipeline sections have been lined.

Near each flange 12, a small "bleeder" hole (typically about 1/32 inch in diameter) is drilled through the wall of the pipeline. The purpose of the bleeder hole is described in more detail below. A threadlet 14 is welded onto the pipe over the bleeder hole.

Flange 12 tapers into neck 18 (best seen in FIG. 3) which is butt-welded onto the end of pipeline section 10. Care should be taken when welding flange 12 onto pipeline section 10 to avoid excessive penetration of weld bead into the cavity enclosed by pipeline section 10. Excessive weld bead should be smoothed by grinding or filing to reduce the possiblity that the liner will be damaged when it is pulled into pipeline section 10. Flange 12 has a raised circular apertured face 20, the inside diameter of the aperture being equal to the inside diameter of pipeline section 10. Flange 12 is conventional in the art, the only modification being the machining of a 6° radius on internal lip 22 of flange face 20. Lip 22 is machined to eliminate sharp edges which might damage the liner segment during insertion into pipeline section 10.

A cable-carrying device 30 (conventionally called a "pig") is shown in FIG. 2. Pig 30 comprises a central body member 32, having a pair of curved rubber cups 34 disposed at opposite ends. The external diameter of cups 34 is slightly greater than the internal diameter of the pipeline so that pig 30 may be tightly fitted inside pipeline section 10. A pair of eyelets 36 are disposed at opposite ends of the pig body member. A cable is attached to an eyelet at one end of pig 30 and the opposite end of the pig inserted into pipeline section 10.

A "pig launching device" 40 (conventional in the art) is shown in FIG. 3. Launching device 40 includes flange 42 which is coupled by means of bolts 44 to flange 12. Plastic gasket 46 is disposed between flanges 12 and 42 to effect a seal. The cable (which has been attached to pig 30, which now rests inside pipeline section 10 near flange 12) passes through aperture 48 at one end of the launching device 40. Water injection port 50 is coupled with a hose or other means to a water truck capable of delivering water under pressure through the hose and into launching device 40. Pressurized water is thus forced through water injection port 50 and cavity 52 and thence into pipeline section 10 behind pig 30 to propel pig 30 along pipeline section 10 with the cable trailing behind. The cable (which may be coiled upon a reel) is drawn through aperture 48 as the pig passes through pipeline section 10. Suitable gasket means should be provided at aperture 48 to prevent excessive loss of water. A water pressure of about 100 psi to 150 psi should suffice to propel the pig and cable through about 2,000 feet of pipeline.

In the absence of a source of pressurized water, compressed air could also be used to force the pig and cable through pipeline section 10.

When pig 30 and the attached cable emerge at the opposite end of pipeline section 10, pig 30 is removed from the cable and replaced by a "pig train" and a test piece of the liner material. The cable is first attached to a carbide steel headed "sizing" pig, having an outside diameter slightly larger than the outside diameter of the liner segment to be inserted into the pipeline section. Preferably, the outside diameter of the sizing pig is about one half the sum of the outside diameter of the liner material and the inside diameter of the pipeline. The sizing pig assists in determining whether the inside diameter of the pipeline section is too small to receive the liner segment. The second pig in the pig train is a wire brush pig having a plurality of wire bristles for scraping built-up scale off the internal pipeline surface. The third pig in the pig train is a rubber-cupped cleaning pig used to carry out of the pipeline section slag or scale broken off the pipeline walls by the first two pigs. The pigs are provided with eye bolts and are connected together with steel cable. Finally, a 25 to 30 foot test section of the liner material to be used in lining the pipeline is attached behind the pig train.

A winch is attached to the cable at the far end of the pipeline section. The pig train and test section of liner material are then pulled through pipeline section 10 with the winch. Preferably, the winch is equipped with a cable odometer so that the operator may determine the location of points at which the pig train may become lodged in pipeline section 10. If the pig train cannot successfully be pulled through pipeline section 10, then it will be necessary to uncover and open the pipeline at the point at which the pig train becomes lodged to effect repairs.

After the test section of liner material has passed through pipeline section 10, it is examined for surface damage. If nicks, gouges, surface slits, etc., on the test section do not penetrate into the liner wall to a depth of more than about 10% of the liner wall thickness, then the liner segment may be safely inserted into the pipeline section. If the surface nicks, gouges, surface slits, etc., penetrate into the liner wall to a depth of more than about 10% of the liner wall thickness, then the pipeline section must be repigged and cleaned to eliminate such liner surface damage. (Preferably, the pipeline section is re-pigged and cleaned if the liner material is penetrated to a depth of more than about 0.04 inches, regardless of its wall thickness.)

Once the pipeline section has been pigged and cleaned to eliminate unacceptable liner surface damage, launching device 40 is again used to propel pig 30 and the cable back through pipeline section 10 so that the cable may be attached to liner segment 70 which is to be pulled into pipeline section 10. This procedure also gives pipeline section 10 a water flush to remove foreign matter.

PULLING LINER SEGMENT INTO PIPELINE SECTION

Various pulling arrangements which may be used to attach the cable to liner segment 70, are shown in FIGS. 4, 5, 6 and 8.

FIG. 4 shows a pulling head 60 having a generally tapered cylindrical configuration. Pulling head 60 may be fabricated from a solid piece of polyethylene, and a hole drilled therethrough to receive pin 62 to which eyelet 64 is affixed. Pin 62 is anchored against longitudinal movement with respect to pulling head 60 by means of washer 68 and bolt 66 which is threadably received on the end of pin 62. Pulling head 60 is fused onto the end of liner segment 70 opposite the end to which flange 86 is attached. Any protruding fusion bead is removed. The cable is then attached to eyelet 64 and pulling head 60 is introduced into pipeline section 10. Pulling head 60 is intended for use in high pressure applications where it is desired to use a close-fitting liner segment having an external diameter of at least 94% of the internal diameter of pipeline section 10. In such close-fitting applications, it is important that pulling head 60 be free of protrusions which might impede transit through pipeline section 10.

The pulling arrangement shown in FIG. 5 comprises a plurality of metal straps 72 spaced circumferentially around an end of liner segment 70 and bolted directly to the liner segment. Cable bridle 74 connects straps 72 to the pulling cable. This arrangement may be used in lower presure applications where the outside diameter of liner segment 70 may be considerably less than the inside diameter of pipeline section 10. For example, this arrangement could be used in lining a sewer line having a 20 inch inside diameter with a polyethylene liner having an 18 inch outside diameter.

The pulling arrangement shown in FIG. 6 may be used in lower pressure applications where misalignment of joints in the pipeline may be encountered, or where foreign matter may have infiltrated into the pipeline section. Pulling head 76 comprises a plurality of metal straps circumferentially spaced around an end of liner segment 70. The straps, which may be bolted to liner segment 70, protrude beyond the end of liner segment 70, and are drawn together to form a cone having an eyelet 78 at its apex. Reinforcing rings 80 add mechanical rigidity. The pulling cable may be affixed to eyelet 78, and pulling head 76 drawn through pipeline section 10 to produce a ploughing action which may permit the realignment of misaligned joints, and which may clear away debris which has accumulated in the pipeline section.

Figure 8:
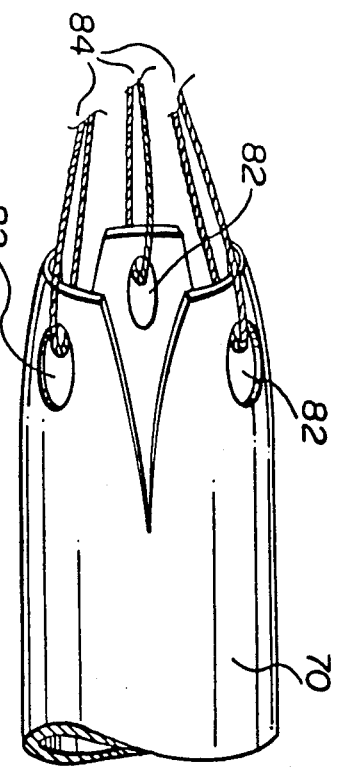
FIG. 8 is a perspective view showing a further alternate arrangement for pulling a liner segment.

The pulling arrangement shown in FIG. 8 should be used only in lower pressure applications to pull a short length of liner into a pipeline section. This arrangement is primarily intended for pulling liner segments on the open pipeline right of way. A plurality of apertures 82 are circumferentially spaced around an end of liner segment 70, and a cable pulling bridle 84 passed through the apertures for affixation to the pulling cable.

Referring to FIG. 7, a trench 102 is provided to assist in inserting liner segment 70 into pipeline section 10. The floor of the trench should be sloped from ground level down towards flange 12 at a ratio of about 5 horizontal to 1 vertical. Care should be taken to prevent kinking of liner segment 70 as it is pulled into pipeline section 10.

In addition to the odometer mentioned previously, the winch apparatus (positioned at the end of pipeline section 10 opposite to that shown in FIG. 7) should be equipped with a cable weight indicator to permit the operator to monitor the pulling force exerted on liner segment 70, and thus ensure that the tensile yield point of the liner material is not exceeded.

FIXING LINER SEGMENT INSIDE PIPELINE SECTION

Once liner segment 70 has been pulled into pipeline section 10, it should be fixed against longitudinal movement with respect to pipeline section 10 with the aid of a second plastic flange like that shown in FIGS. 9 & 10.

The cable winch is used as described above to pull liner segment 70 into pipeline section 10 until flange 86 contacts flange 12. Liner segment 70 is then stretched by continuing to pull on liner segment 70 while flange 86 contacts flange 12, care being taken however, not to exceed the tensile yield point of liner segment 70. A clamp 92 (FIG. 11) is then affixed around the end of liner segment 70 opposite to flange 86 at the point the liner segment protrudes from the pipeline section, to hold the liner segment against pipeline flange 12, thereby preventing liner segment 70 from retracting within pipeline section 10. Pulling head 60 is then cut away from liner segment 70, and a second plastic flange identical to that shown in FIGS. 9 & 10 is fused onto the end of liner segment 70 which protrudes from pipeline section 10. Clamp 92 is then removed and liner segment 70 is allowed to retract inside pipeline section 10 until the second plastic flange contacts pipeline flange 12.

Figure 12:
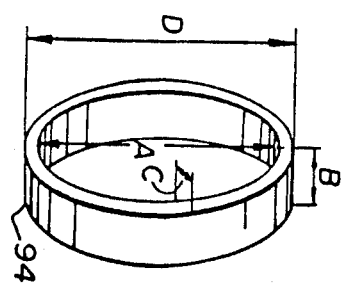
FIG. 12 is a perspective view of a retaining ring for use with the plastic flange of FIGS. 9 & 10.

A steel retaining ring 94 (FIG. 12) should be used to encircle the plastic flanges to prevent deformation thereof when the pipeline is pressurized. The inside diameter "A" of retaining ring 94 equals the outside diameter of plastic flange face 90. The outside diameter "D" of retaining ring 94, is sized such that retaining rig 94 will fit inside the bolt circle pattern of flange 12.

Figure 13:
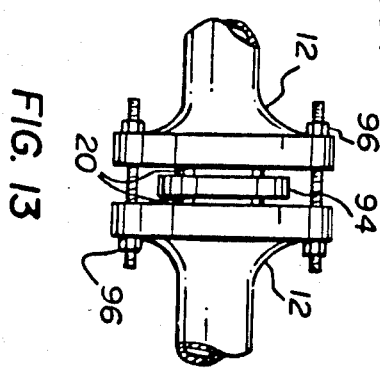
FIG. 13 is a sectional view showing the installation of the retaining ring of FIG. 12.

When a pair of adjacent pipeline sections have been lined, those sections are joined together using bolts 96 to couple opposing flanges 12 as shown in FIG. 13. (Obviously, it is important that the bolt circle patterns of opposing flanges 12 be aligned when the flanges are welded onto adjoining ends of a pair of pipeline sections, so that the bolts 96 will easily pass through both flanges.) Opposed plastic flange faces 90 will be in sealing engagement between the steel flange faces 20. The width dimension "B" of retaining ring 94 is sized to permit a tight seal between opposed faces 90 of plastic flanges 86 while preventing contact between the circumferential ends of retaining ring 94, and opposed flange faces 20.

Work proceeds in the above manner over the length of the pipeline. The pipeline is uncovered at selected points to create pipeline sections into which liner segments are drawn. The bell holes which serve as work sites at opposed ends of the various pipeline sections are left open as the pipeline sections are lined.

RADIALLY EXPANDING LINER SEGMENTS

When liner segments have been inserted into all pipeline sections, and the pipeline sections joined together to reform the pipeline, the liner segments may be radially expanded inside the pipeline sections.

Plugs 16 are first removed from threadlets 14 along the entire length of the pipeline. A relatively warm (typically about 180° F.) fluid such as water or oil is then injected into one end of the lined pipeline and allowed to flow freely therethrough and emerge from the opposite end thereof. The warm fluid injection serves to commence radial expansion of the liner segments toward the inside walls of the pipeline sections. The warm fluid injection also serves to alter some mechanical properties of the liner material in an advantageous manner. For example, at warmer temperatures, thermoplastic materials such as UHMWHDP can sustain more deformation before rupturing. Such materials also deform more quickly under constant stress as temperature increases. These two characteristics are prime considerations which suggest the selection of thermoplastic materials such as UHMWHDP as a liner material and which suggest the injection of warm fluid into the lined pipeline to raise the temperature of the liner material. To take full advantage of these alterations in mechanical properties, all liner segments in the pipeline should be at at least 70° F. before the pressure expanding step discussed below is started. Preferably, warm fluid injection is maintained until the pipeline itself is at least warm to the touch (70° F.–100° F.) at the end from which the injected fluid emerges.

The mere injection of warm fluid is not sufficient to expand the liner segments outward to contact the inside walls of the pipeline sections. Pressure must be applied to continue the radial expansion of the liner segments until they contact the inside walls of the pipeline sections. Ideally, the liner segments are expanded such that they retain their expanded configuration and remain in contact with the inside wall of the pipeline section after injection of the warm pressurized fluid terminates. When the temperature of all liner segments in the pipeline has been raised to at least 70° F., the end of the pipeline from which the injected fluid emerges is blocked off. The injection of warm fluid at the opposite end of the pipeline is, however, continued. The continued injection of warm fluid will exert pressure inside the liner segments, tending to expand the liner segments radially outward against the inside walls of the pipeline sections, thus evacuating the annular regions between the liner segments and the pipeline sections by forcing entrapped air and fluids out through the bleeder holes.

The pressure exerted inside the lined pipeline should be monitored and controlled so that it does not exceed about 100 psi. As this pressure increases, a "plateau" will be observed at which pressure does not increase as additional warm fluid is injected into the lined pipeline. The pressure inside the lined pipeline should be held relatively constant on the "plateau" to permit the liner segments to expand radially outward to contact the inside walls of the pipeline. At least 20 minutes should be allowed for radial expansion of the liner segments out to the inside walls of the pipeline sections. Once the liner segments have contacted the inside walls of the pipeline, there will be observed an increase in pressure above the "plateau" as more warm fluid is injected into the pipeline. Care should be taken to avoid injection of substantial quantities of warm fluid into the lined pipeline before all liner segments have expanded out to contact the inside walls of the pipeline. Otherwise, localized stresses may develop on the liner segments, causing rupture of the liner.

As pressure inside the pipeline increases, "geysers" about 10 to 15 feet high may be observed at the bleeder holes. This "geyser" effect will usually subside within about 20 to 30 minutes, although the bleeder holes may continue to blow air for some considerable time thereafter. After a period of about 2 to 3 hours, there may be observed a dripping of a milky-white substance (believed to be emulsified air and water) at the bleeder holes. At this point, the bulk of the air and water entrapped between the liner segments and the inside walls of the pipeline sections will have been evacuated, and plugs 16 may be inserted into threadlets 14 to close the bleeder holes. The pipeline may then be subjected to the usual tests required to satisfy the appropriate regulatory bodies.

In addition to expanding the liner segments within the pipeline sections, the radial expansion procedure will also indicate whether particular liner segments have been damaged during installation. If the wall of a particular liner segment has been pierced during installation, then the afore-mentioned "geyser" effect will not diminish at the bleeder holes of the pipeline section which contains that liner segment, due to the escape of pressurized fluid through the liner segment into the annular region between the liner segment and the inside wall of the pipeline section. If such damage has occurred, then it will be necessary to remove the defective liner segment, repig and reclean the particular pipeline section, install a new liner segment and then repeat the injection of warm fluid and the pressure expansion step.

Evacuation of the annular region between respective liner segments and pipeline sections may serve a further useful purpose. If the pipeline has to be shut down or depressurized such that a vacuum condition is created inside the liner segments, then, if plugs 16 have been inserted into threadlets 14 to close the bleeder holes, an offsetting vacuum condition should be present in the annular region surrounding each liner segment which may tend to prevent collapse of the liner segments due to the vacuum inside the liner segments.

We claim:

1. A method of lining a section of a high pressure pipeline which utilizes the structural strength of the pipeline to enable the lined pipeline section to be operated at high pressure, said section including first and second pipe flanges disposed at opposite ends thereof, the method comprising:
    (a) providing a plastic liner having:
        (i) a wall thickness and composition such that the liner is firm and self-sustaining in tubular form;
        (ii) an outside diameter sufficiently less than the inside diameter of the pipeline to enable drawing the liner through the pipeline section, but sufficiently large so that the liner can be non-destructively radially expanded against the inside wall of the pipeline;
    (b) drawing the liner in non-collapsed condition into the pipeline section by pulling the liner from one end area thereof through the pipeline section until the liner is substantially longitudinally co-extensive with the pipeline section;
    (c) before concluding said drawing step, affixing a first liner flange to the end of said liner segment opposite said one end area;
    (d) completing the drawing step to position said first liner flange against said first pipe flange;
    (e) longitudinally stretching the liner within the pipeline section by elongating said liner without exceeding the elastic limit of the liner by pulling said one end area of the liner beyond the length of the pipeline section while said first liner flange prevents longitudinal movement of the opposite end of said liner along the pipeline section;
    (f) after said stretching step, affixing a second liner flange to said one end area of said liner segment opposite said first liner flange;
    (g) positioning said second liner flange against said second pipe flange by permitting the liner to elastically retract into the pipeline section;

(h) opening at least one bleeding port in the pipeline section;

(i) radially expanding the liner against the inside wall of the pipeline to an extent to permanently change the liner outside diameter from its original size to a size conforming to the inside diameter of the pipeline;

(j) during step (i), bleeding the space between the liner and the pipeline through the bleeding port; and (k) closing the bleeding port.

2. A method as defined in claim 1, wherein the liner is radially expanded by no more than 6% of its original diameter.

3. A method as defined in claim 1, wherein said radially expanding step comprises applying to the interior of the liner a warm fluid under sufficient pressure to carry out the expansion.

4. A method as defined in claim 3, wherein said fluid has a temperature of about 180 degrees F. and a pressure of not more than about 100 psi.

5. A method as defined in claim 4, which further comprises, before said radially expanding step, encircling said liner flanges with retaining rings.

6. A method as defined in claim 1, which further comprises, before said drawing step, passing a short piece of liner material through the pipeline section to detect matter protruding into the space to be occupied by the liner.

7. A method as defined in claim 6, which further comprises, before said drawing step, removing from the inside wall of the pipeline matter protruding into the space to be occupied by the liner.

8. A method as defined in claim 1, 2 or 3, wherein said liner material is high density polyethylene.

9. A method as defined in claim 1, wherein the outside diameter of said liner before radial expansion thereof is at least 94% of the inside diameter of the pipeline section.

10. A method as defined in claim 1, wherein, for a given inside diameter of pipeline section, the outside diameter of said liner before radial expansion thereof is at least 94% of said inside diameter in the case of an inside diameter between about 2 inches to about 4 inches, and increasing to about 96.5% of said inside diameter in the case of an inside diameter of about 10 inches or greater.

11. A method as defined in claim 1, wherein, for a given inside diameter of pipeline section, the outside diameter of said liner before radial expansion thereof is at least:

(a) 94% of said inside diameter in the case of an inside diameter between about 2 inches to about 4 inches;

(b) 95% of said inside diameter in the case of an inside diameter of about 4 inches;

(c) 96% of said inside diameter in the case of an inside diameter between about 6 inches to about 8 inches;

(d) 96.5% of said inside diameter in the case of an inside diameter of about 10 inches or greater.

* * * * *